May 23, 1944.   H. BRAND   2,349,588
METHOD AND APPARATUS FOR VACUUMIZING CONTAINERS
Filed Dec. 5, 1941

INVENTOR
HERBERT BRAND
By Young, Emery & Thompson
ATTYS.

Patented May 23, 1944

2,349,588

UNITED STATES PATENT OFFICE 2,349,588

METHOD AND APPARATUS FOR VACUUMIZING CONTAINERS

Herbert Brand, Zollikon, Switzerland

Application December 5, 1941, Serial No. 421,841
In Switzerland October 30, 1940

6 Claims. (Cl. 226—82)

This invention relates to a method for vacuumizing containers, a device for carrying out the method and a container vacuumized according to this method.

In vacuumizing devices of greater output, measuring instruments are used which, however, for the daily handling of cans in small concerns, and particularly in the household are unsuitable. There was thus no possibility of controlling in a simple manner the vacuum of containers, in which goods are canned, taken out in portions, so that the container must be tightly closed again and again.

The object of the present invention is a method for vacuumizing containers, which is characterised in that a disc or lamella placed upon an opening of the container to be vacuumized is lifted, by turning about a portion of its edge, from this opening through the suction effect of a suction member until such a vacuum in the container is reached, that the suction member, owing to the atmospheric overpressure, is deformed, so that it presses the lamella towards the container, the lamella thereby tightly closing the opening.

The device for carrying out the method is characterised by a suction member adapted to hold the disc at a portion of its edge about which it can turn or tilt, and having a wall whose resistance against deformation is such that, when the desired vacuum is attained, it is deformed, owing to the outer overpressure, to press against the disc and turn it into sealing position.

In this way a quick and sufficiently exact control of the vacuum in the treated container is possible.

The container vacuumized according to the present method is thereby provided with a disc or a lamella tightly closing the vacuumizing opening of the container.

Figure 1:
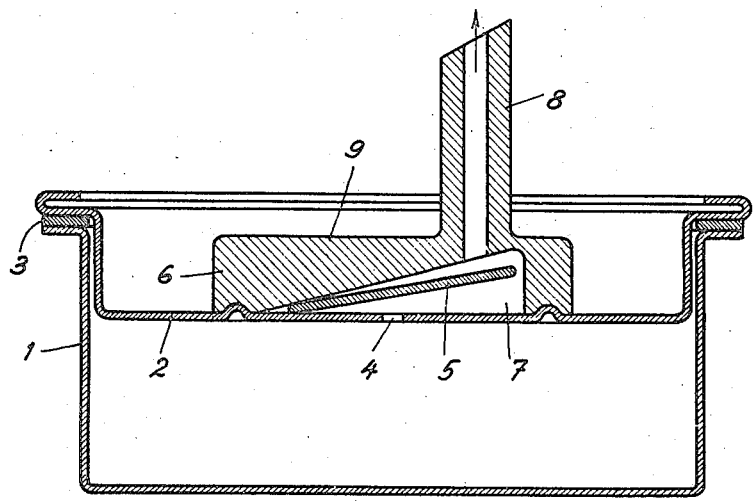

Other objects and features will be apparent as the following description proceeds, reference being had to the accompanying drawing in which Fig. 1 is a section of a first embodiment of the vacuumizing apparatus applied to a container from which air is to be withdrawn.

Figure 2:
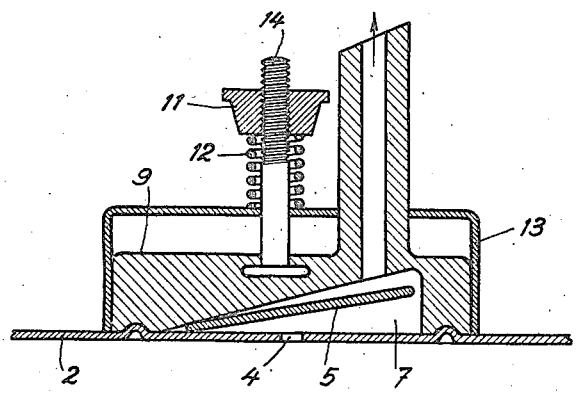

Fig. 2 is a section of a second embodiment of the vacuumizing apparatus applied to a container.

The container 1 with the lid 2 and the sealing gasket 3 has an opening 4 which may be closed by a disc or lamella 5 made of rubber, cellulose adhesive ribbon, metallic adhesive foil or the like. In order to withdraw air from the container 1, a suction cup 6 made of rubber or any other elastic material and provided with a chamber 7 of wedge shaped cross section, is placed on the same. The one end of the lamella 5 is held resiliently but firmly in the edge part of the wedge-shaped chamber 7. The other end is free to be raised from contact with the lid 2, by turning of the disc on the held part of its edge, in order to lay the opening 4 open.

The suction cup 6 is connected to a vacuum pump, ejector or any other suction device by means of a hose 8. When this suction device is actuated a vacuum arises in the chamber 7 and the lamella 5 is lifted off from the opening 4. The air in the container is now sucked off. On withdrawing air from the container, an atmospheric overpressure upon the suction cup 6 takes place. The chamber 7 has its upper wall 9 so tapered in thickness that it forms a beam of uniform bending strength. At a certain amount of overpressure the wall 9 is deformed and presses the lamella 5 towards the lid 2 of the vacuumized container 1, thereby closing the opening 4. By a suitable dimension of the upper wall 9 of the cup 6 the desired rate of vacuumizing can be predetermined, i. e., to close the opening 4 at a low or at a higher degree of vacuum.

As is shown in Fig. 2 the suction cup 6 may also be enclosed in a metallic casing 13 and for the purpose of adjusting the bending of the wall 9 and the degree of vacuum required to operate the device, an adjusting nut 11 on a threaded spindle 14 may be provided for loading a spring 12. The tension of this spring has an influence on the deformation of the wall 9. The cup 6 and the lamella 5 may be placed on a part of the container other than the lid.

The lamella 5 also allows easy opening of the container. If the container 1 is closed by the lid 2 at a low atmospheric pressure, the lid 2, at a higher atmospheric pressure, could be lifted off by hand but only with considerable difficulty. By raising the lamella 5 from the opening 4, however, pressure equalization may be obtained, allowing the lid 2 to be easily removed.

The lamella 5 may serve the further purpose of allowing vapour generated in the interior of the container to escape through the opening 4, when the container 1 with the lid 2 is used for sterilization. In this case the lamella acts as a valve permitting the overpressure in the interior of the container to be exhausted and, after cooling of the contents of the container, the opening will be closed in that the lamella is drawn down by the vacuum occurring in the container.

What I claim is:

1. A suction cup for applying a sealing disc to an aperture in a container to be sealed under vacuum comprising a suction chamber with a lip applicable to the wall of the container around the aperture the internal wall of said chamber being so shaped as to hold the disc resiliently at one portion of its periphery with freedom to turn about said held portion inside the chamber, and in which at least a portion of the wall of the chamber is deformable under a predetermined vacuum within the chamber to turn said disc and press it into sealing position.

2. A suction cup for applying a sealing disc to an aperture in a container to be sealed under vacuum, comprising a suction chamber applicable to the wall of the container around the aperture and disc said chamber having a deformable wall portion operable to press said disc into sealing contact around the aperture when a predetermined vacuum exists in said chamber, a rigid member attached to said chamber, and means connected between said deformable wall portion and said rigid member to vary the vacuum required to press the disc into said sealing contact.

3. A suction cup according to claim 1 in which the suction chamber cavity is of wedge shaped cross section with the wall at the edge of the wedge acting to resiliently hold the disc inclined relatively to the apertured wall of the container.

4. A suction cup according to claim 1 in which the suction chamber cavity is of wedge shaped cross section with the wall at the edge of the wedge acting to resiliently hold the disc inclined relatively to the apertured wall of the container, and in which the wall of the cavity opposite the aperture tapers in thickness from the disc holding part towards the larger end of the wedge-shaped cavity, the thinner portion of said wall being deformable.

5. A suction cup according to claim 2 in which the rigid member is a casing in which the suction chamber is mounted with the outer wall of the chamber adjacent an inner wall of the casing, and in which the vacuum varying means includes a bolt anchored in said deformable wall portion and extending through the casing, a nut on said bolt, and a spring between said nut and said casing.

6. A method for vacuum sealing a container comprising placing a sealing disc over an aperture in a wall of the container, applying a flexible suction cup to said wall to enclose said disc and to grip a portion of the edge of the disc, evacuating said suction cup to cause said disc to tilt about the said edge portion into an inclined position uncovering the aperture, and further evacuating said suction cup until it collapses on said inclined disc and presses the latter into sealing position over the aperture.

HERBERT BRAND.